US 8,352,334 B2

(12) United States Patent
Ulinski

(10) Patent No.: US 8,352,334 B2
(45) Date of Patent: Jan. 8, 2013

(54) SYSTEM AND METHOD FOR ORDERING SUPPLIES FOR A MULTIFUNCTION DEVICE USING A MOBILE WIRELESS HANDSET

(75) Inventor: John Stanley Ulinski, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 631 days.

(21) Appl. No.: 12/361,622

(22) Filed: Jan. 29, 2009

(65) Prior Publication Data

US 2010/0191617 A1 Jul. 29, 2010

(51) Int. Cl.
*G06Q 30/00* (2006.01)
(52) U.S. Cl. .................. 705/27.1; 705/26.8; 705/26.81; 705/26.82; 705/27.2
(58) Field of Classification Search .................. 705/27.1, 705/27.2
See application file for complete search history.

(56) References Cited

U.S. PATENT DOCUMENTS

| 7,752,556 B2* | 7/2010 | Forstall et al. ............... 715/761 |
|---|---|---|
| 2006/0010042 A1 | 1/2006 | Gianakis et al. |
| 2006/0156253 A1* | 7/2006 | Schreiber et al. ............. 715/835 |
| 2007/0203804 A1* | 8/2007 | Kargman ........................ 705/26 |
| 2008/0097871 A1* | 4/2008 | Williams et al. ............... 705/26 |
| 2008/0098290 A1* | 4/2008 | Williams et al. ............... 715/209 |
| 2008/0120658 A1* | 5/2008 | Cubillo ........................... 725/91 |
| 2008/0184112 A1* | 7/2008 | Chiang et al. ................. 715/700 |
| 2008/0255962 A1* | 10/2008 | Chang et al. ..................... 705/27 |
| 2009/0207449 A1* | 8/2009 | Johnson et al. .............. 358/1.15 |
| 2010/0082447 A1* | 4/2010 | Lin et al. ........................ 705/26 |
| 2010/0082455 A1* | 4/2010 | Rosenblatt et al. ............. 705/27 |

OTHER PUBLICATIONS

"Composable ad hoc location-based services for heterogeneous mobile clients"; Hodes, Todd D.; Katz, Randy H., Wireless Networks vol. 5, 1999, pp. 411-427.*

* cited by examiner

*Primary Examiner* — M. Thein
(74) *Attorney, Agent, or Firm* — Philip E. Blair; Fleit Gibbons Gutman Bongini & Bianco P.L.

(57) ABSTRACT

What is disclosed is a novel apparatus and method for effectuating the ordering of supplies via a wireless handset device. In one embodiment, the handset is pre-loaded with a plurality of folders each representing a multifunction device. A user navigates the hierarchy of folders and selects a folder. The user then selects at least one graphical widget contained therein representing a particular supply commodity available for order from a supplier. In response to a user selection thereof, a part number identified by the selected graphical widget and a supplier profile are retrieved from memory. The profile contains the ordering method and contact information. An order message is prepared according to the ordering method prescribed by the profile and is sent to the supplier to place an order for that supply commodity. The process repeats until no more supplies are to be ordered. Additional features, enhancements, and embodiments have been provided.

17 Claims, 8 Drawing Sheets

SYSTEM AND METHOD FOR ORDERING SUPPLIES FOR A MULTIFUNCTION DEVICE USING A MOBILE WIRELESS HANDSET

TECHNICAL FIELD

The present invention is directed to methods for facilitating the ordering of supplies for a multifunction document reproduction device via a mobile handheld wireless cellular telephonic device over a wireless communication network.

BACKGROUND

Multifunction document reproduction devices are widely used in the corporate and professional office environments. One such corporate office building may have dozens of different types of diverse multifunction devices with each device requiring a steady supply of, for example, toner, cartridges, copier paper and other media, staples, replacement parts, and the like. Such supplies are often referred to as consumables because these are consumed during the operation of the device and must be resupplied on a recurring basis. A key operator or manager in charge of maintaining the supply for each device is often responsible for reordering supplies. It may be difficult for the key operator or manager to keep track of which supplies are associated with each multifunction document reproduction device.

When placing the order, the manager must know which specific supplies for which particular multifunction devices need to be ordered at any given time. The placement of a supply order for sophisticated multifunction devices can require detailed knowledge about various supplies and part numbers and the like. This can be an especially tedious and time consuming process for key-operators and other managers of large fleets of multifunction devices for which a large volume of differing supplies must be maintained and readily available for use.

Given that many managers of such multifunction devices today carry a wireless handheld cellular device, what is needed are methods which facilitate the placement of orders for supplies for fleets of multifunction devices via their mobile wireless handsets.

BRIEF SUMMARY

What is provided are a novel apparatus, method, and computer program product for effectuating the ordering of various supplies for a multifunction device from a supplier thereof via a mobile wireless handset device. The present method provides key operators of diverse multifunction devices with the capability to quickly and efficiently order supplies for various multifunction devices directly from their wireless handset device.

In one example embodiment, the present method involves the following. A plurality of device-specific representations such as, for example, iconic folders, are uploaded into a memory of the wireless handset. Each of the iconic folders represents a multifunction device. Within the iconic folders are contained graphical widgets. Each widget (or icon) represents a supply commodity specific to that particular multifunction device. A supply commodity can be anything available for order such as, for example, ink, toner, paper, staples, parts, software, manuals, training, service, upgrades, and/or technical support. Associated with each of the supply commodities is a profile of a supplier of that commodity. The supplier profile contains contact information about the supplier and information pertaining to ordering that particular commodity from the identified supplier. A user, using the wireless handset pre-loaded with the hierarchy of iconic representations of the various multifunction devices, selects one representation which brings up a display of the various supply commodities for that multifunction device. The user then selects the supply commodity to be ordered. In response to the user selection, the associated supplier profile is retrieved from memory. The wireless handset device then prepares an order message according to the retrieved supplier profile. The order message may further contain additional information in a manner prescribed by the profile. The order message is then sent to the contact of the supplier in the desired format. Depending on the ordering requirements as identified in the supplier profile, the user may be prompted to enter a quantity of the supply commodity to be ordered. A confirmation of the order may be returned by the supplier. The order is then processed by the supplier in a manner according to a previously established buyer account record. The process is repeated for additional supply commodities to be ordered.

In yet another embodiment, one or more of the iconic folders for the multifunction devices further contain other various graphical widgets in addition to those representing supply commodities. These other widgets include, for example, a service widget. Upon selection of the service widget in the sub-folder of the multifunction device, an order message is automatically prepared in a manner prescribed in the associated supplier profile which places an order requesting, for instance, the scheduling of a technical service for that particular multifunction device. Another widget is an account widget which upon selection sends a message requesting one of the supplier's account representatives to initiate a communication with a contact person identified in the buyer's account record. In yet another embodiment, the graphical widget is a funds widget which, upon a selection thereof, authorizes a transfer of funds into an account to be drawn by the supplier in a manner provided by the buyer's account record.

In yet a further embodiment, the supplier sends coded messages directly to the wireless handset device of their respective buyers which updates their profile information and their various supply commodities. The hierarchy of device-specific folders and the various graphical widgets are modified accordingly to reflect the received updates. The suppliers can also send coded message sequences directly to the wireless handsets pointing that buyer to supply commodities which, for example, which are being offered at a discount rate, and the like. Advertisements regarding various supply commodities being offered can further be sent to the wireless handsets of the buyers by the respective suppliers. The supplier can notify the buyer that they might be getting low on certain supply commodities given their order histories and the passage of time without an order having been placed. The supplier can also notify the buyer to contact them for some reason.

Other features and advantages of the above-described apparatus and method will become apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are an apparatus and method which facilitates the ordering of various supplies from a supplier thereof via a wireless handset device. The present apparatus and method provides key operators of fleets of multifunction devices with the ability to quickly and efficiently order supplies directly from their wireless handset devices.

One of ordinary skill would be knowledgeable about computer science and software and programming systems and methods sufficient to implement the functionality and capabilities described herein without undue experimentation. It is to be appreciated that the disclosed embodiments are merely examples which can be embodied in forms other than the forms disclosed. Structural and functional details, as well as definitional terms, are provided to facilitate a description hereof and are not to be construed as being limiting. The scope of the invention is defined by the appended claims.

DEFINITIONS

A "multifunction device" is a broad term intended to refer to anything such as a service, work project, or device which requires a supply or re-supply of consumable resources which can be ordered in accordance with the teachings hereof. The list of resources which any given "multifunction device" consumes in the course thereof may differ from environment to environment. For example, in the office environment a "multifunction device" refers to the set of document reproduction devices, generally known in the arts, encompassing an array of diverse apparatus including copiers, printers, and other xerographic equipment, book-printing machinery, facsimile devices, photographic and other image production and reproduction devices. Such devices consume resources such as ink, toner, paper, staples, and the like, which need to be periodically resupplied. A "multifunction device" may also refer to, for instance, a construction project which requires consumable supplies to be ordered such as, electrical supplies, flooring, construction supplies, tools, parts, and the like. Other environments would have their own supply commodities.

Figure 4:
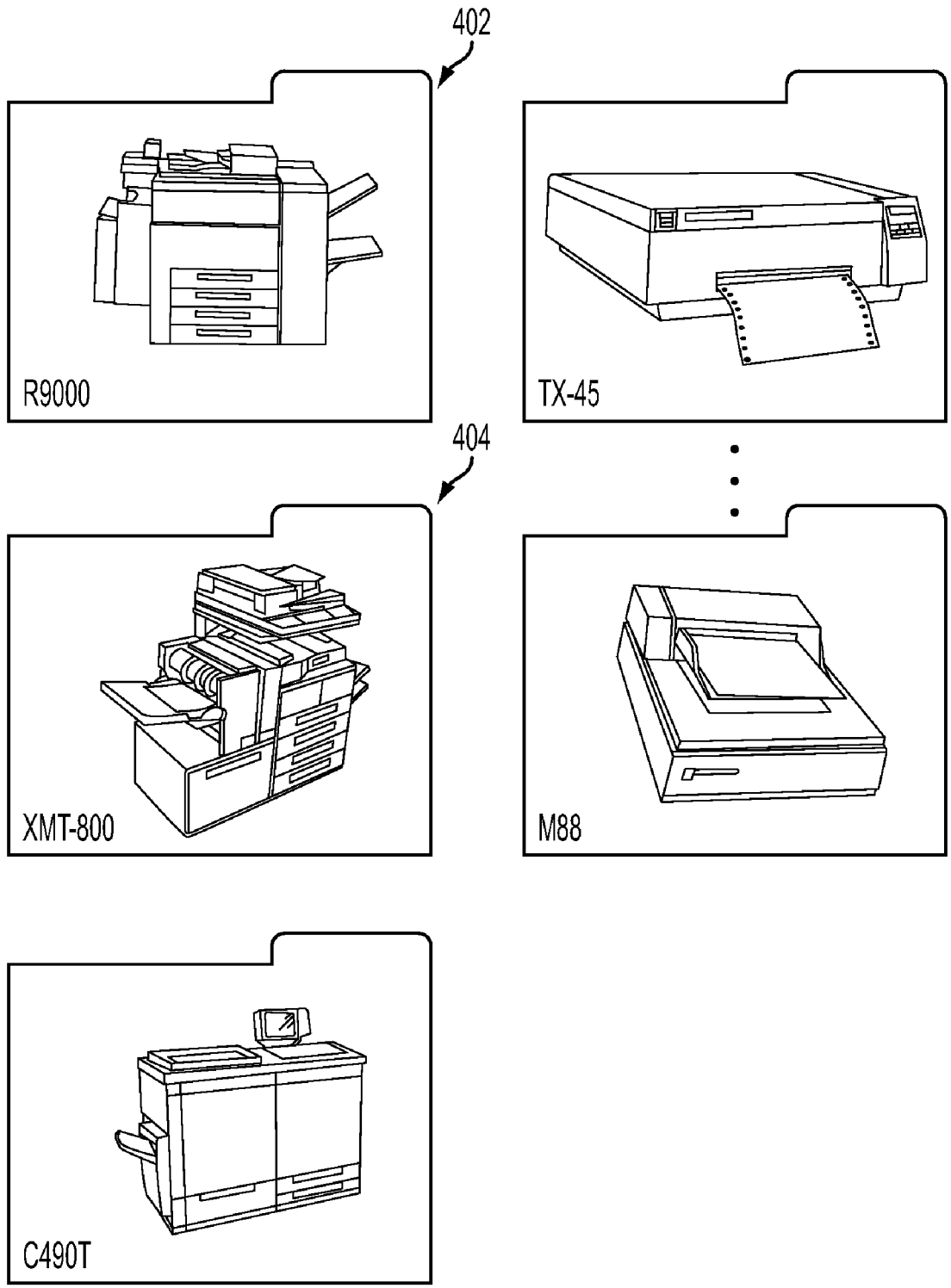
FIG. 4 illustrates one example set of device-specific representations shown as iconic folders, each associated with a particular multifunction device represented thereon and each containing one or more supply commodities available for order for that device in accordance with the present method.

A "device-specific representation" refers to a folder which points to files, folders, graphical widgets or icons contained therein, as is known in the software arts. One example set of device-specific representations represented by iconic folders is shown in FIG. 4. Each iconic folder is associated with a multifunction device. Such an iconic folder can assume a variety of text, audio, tactile, and visual representations so as to provide a user thereof with a discernable indication of which specific multifunction device the device-specific folder represents. Multifunction devices and the components and sub-components thereof can be represented by iconic folders arranged in a navigateable hierarchy. Each iconic folder contains one or more graphical widgets, with each widget representing a supply commodity available for order for that multifunction device.

A "graphical widget" refers to a user-selectable software object made selectable through a physical manipulation of buttons on a user interface of a wireless handset device. Such a widget generally takes the form of an icon as is normally known in the computer science arts. Generally, an icon is a small pictogram used to visually supplement the set of alphanumeric characters. Icons may take the form of a Graphics Interchange Format (GIF) in bitmap image format. Such widgets are constructed to provide a user thereof with a visual representation of the object which the widget is intended to represent. For example, a graphical widget which is intended to represent a supply commodity of a toner preferably resembles a toner cartridge, or has text associated therewith which provides that indication. Text, audio, and video may be associated with a graphical widget to better represent the object. Such graphical icons have one or more property fields associated therewith which, upon a user selection thereof, are used by the device operating system to activate a predefined hardware/software function or capability. Icons are widely used and may represent any of a sting, field, record, file, application, device, interface, another icon or folder, to name a few.

Figure 5:
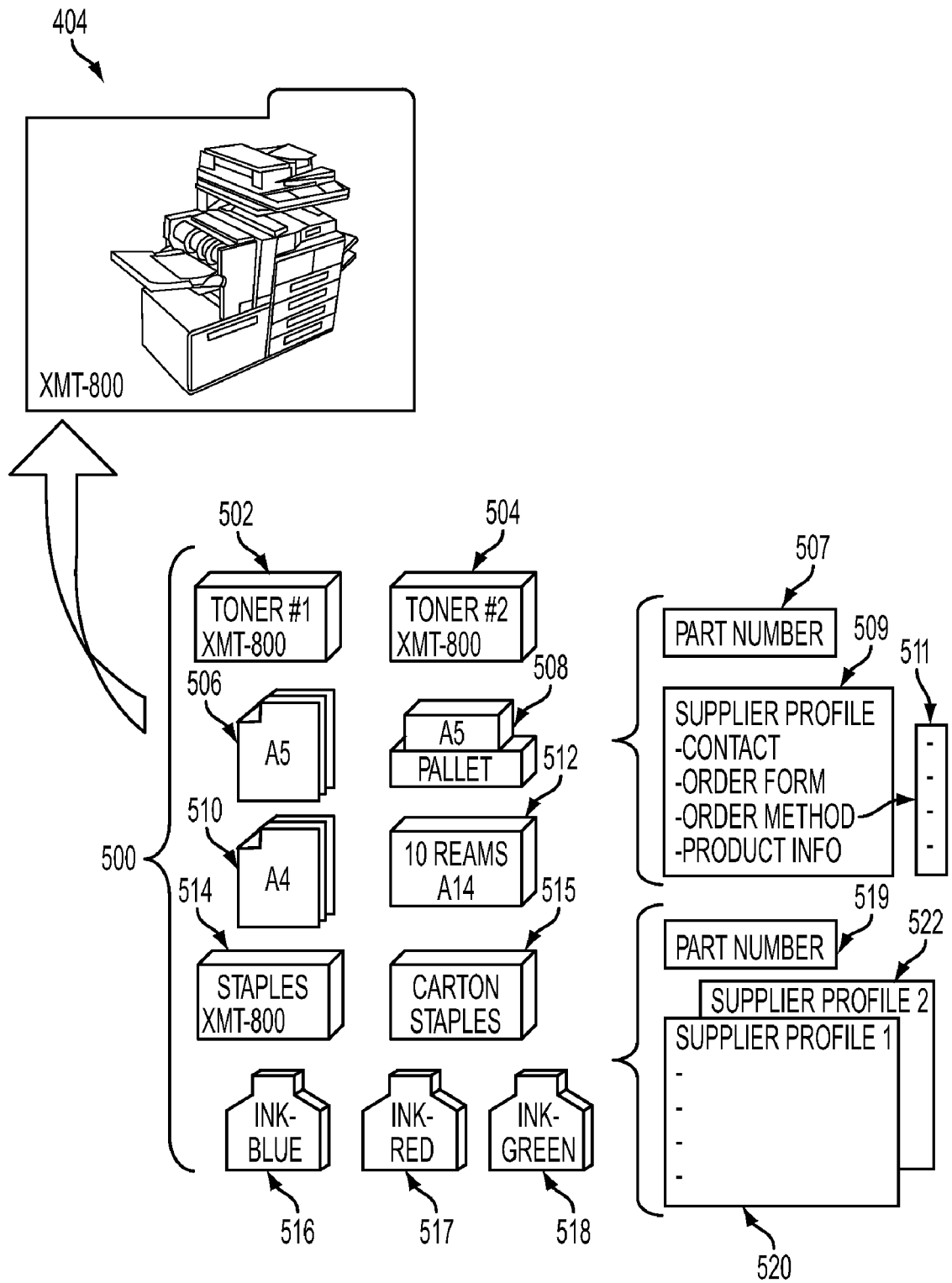
FIG. 5 illustrates one example set of supply commodities available for the multifunction device labeled as the "XMT-800" shown in FIG. 4.

A "supply commodity", as used herein, refers to a resource orderable for a multifunction device. An example set of supply commodities available for a multifunction device is shown in FIG. 5. In the context of multifunction document reproduction devices, as described above, these commodities include such supplies as: ink, toner, paper, staples, replacement parts, software, manuals, support, training, service, upgrades, and the like, each of which can be ordered by a buyer from a supplier thereof. Generally, a supply commodity is intended to broadly refer to any commodity which can be associated with a particular multifunction device and which be ordered in a manner in accordance with the teachings hereof. It should be appreciated that graphical widgets (iconic representations) do not have to be unique to each supply commodity. For instance, a single graphical widget may be used for all types of paper, for example, with identifying text being a differentiating factor.

A "part number" refers broadly to any product marking or code which is unique to a particular commodity. Once such product code is visually represented as a barcode in a machine readable pattern of bars or lines. Barcodes can be read by optical scanners called barcode readers and decoded using specialized hardware/software tools. Data in barcodes is typically represented in widths and spacings of lines arrayed as linear 1-dimensional symbologies. Such symbologies however can assume various other geometric patterns such as squares, triangles, hexagons, and the like. Another would be a RF-ID chip or other tags or markers capable of uniquely identifying their respective commodities.

A "wireless handset" or "wireless device" refers to any of a variety of mobile wireless communication devices known in the digital communication arts. The term is intended to broadly reference mobile handheld devices that can wirelessly receive signals and wirelessly transmit signals to another device using established protocols. One example wireless handset is show and discussed with respect to FIG. 6. Wireless handsets generally comprises a computer processor and a memory. Such a handset device has a user interface and a keypad therewith to facilitate a user input. The handset device is capable of storing, navigating, and referencing a hierarchy of device-specific folders (and sub-folders) containing one or more graphical widgets. Such a handset is also capable of receiving, storing, retrieving, indexing, and referencing profile records of different suppliers. The processor and memory of such a wireless handset contains hardware/software for assembling an order message in a manner prescribed by a supplier profile record and wirelessly communicating the order message to a contact number of the supplier obtained from the profile. An order message may take the form of an order form, a text, voice, audio, or video message. Such a message may be further enhanced to assist the visually impaired or those with visual/auditory challenges. Such a wireless device may also be placed in communication with devices designed to assist those with physical or mental handicaps.

Example Wireless Communication System

Figure 1:
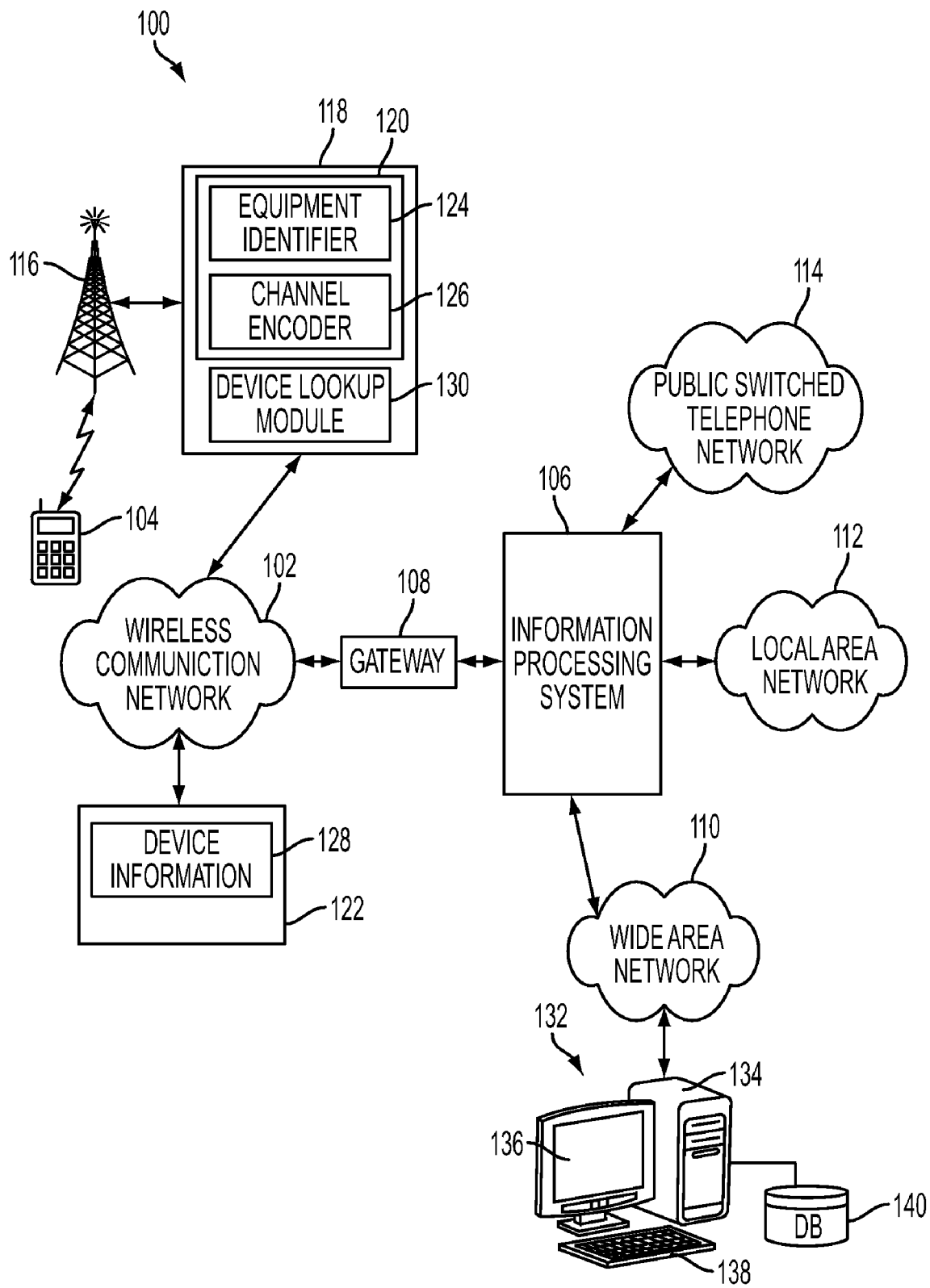
FIG. 1 illustrates a high-level view of one embodiment of a wireless communication system through which an example wireless handset will communicate to carry out various aspects of the present method.

Reference is now being made to FIG. 1 which illustrates one embodiment of a wireless communication system 100 through which a wireless handset will communicate to a supplier to carry out various aspects of the present method.

According to the illustrated embodiment, the wireless communication network 102 generally comprising a plurality of diverse networks such as, for instance, a phone network, a text messaging network, a pager network, and other networks, which connects wireless device 104 to various network components and systems. The set of wireless devices supported by the communication network includes mobile phones, cellular devices, smart phones, text messaging devices, or any combination of a wireless handset device in combination of a handheld personal computer (PC) or a personal digital assistant (PDA), or a like device which typically incorporates a variety of application processing, memory, and storage capabilities. The wireless handset would include a Subscriber Identity Module (SIM) card for identifying the subscriber of the device to the communication network. A SIM holder, designed to receive the SIM card and to affix the SIM securely to the device, would be formed in a chassis of the wireless device.

The communications standard of the wireless communication network broadly conforms to present 2G/3G standards for wireless communication as defined by the wireless communications industry. Example standards include Code Division Multiple Access (CDMA), Time Division Multiple Access (TDMA), Global System for Mobile Communications (GSM), General Packet Radio Service (GPRS), Frequency Division Multiple Access (FDMA), IEEE 802.16 family of standards, Orthogonal Frequency Division Multiplexing (OFDM), Orthogonal Frequency Division Multiple Access (OFDMA), Wireless LAN ("WLAN"), WiMAX, LTE, UMB, IDEN, or the like. The wireless network additionally conforms to various text messaging standards such as Short Message Service (SMS), Enhanced Messaging Service (EMS), Multimedia Messaging Service (MMS), and the like, for the transmission and reception of audio, video, and text messages. The wireless communication network is capable of broadband wireless communications utilizing time division duplexing (TDD) as set forth by the IEEE 802.16e standard. Such a scheme allows for the transmissions of signals in a downstream and upstream direction using a single frequency. TDD may be only used for a portion of the available communication channels in the system, while one or more other schemes are implemented for the remaining channels. Wireless device 104 is capable of wirelessly communicating using a standard that supports TDD.

Wireless communication system further includes one or more information processing systems 106, such as a computing system configured to function as a server, communicatively coupled to the wireless communication network via gateway 108. The information processing system maintains and controls a packet data network and a circuit services network which communicatively couples wireless device 104 to any of a wide area network 110 such as the Internet, a local area network 112, and a Public Switched Telephone Network (PSTN) 114. Each network has the ability to send/receive communication signals to/from wireless device 104. A packet data network is an Internet Protocol (IP) connectivity which directs communications over the Internet and generally comprises any of an Evolution Data Only (EV-DO), General Packet Radio Service (GPRS), Universal Mobile Telecommunications System (UMTS), an 802.11, 802.16 (WiMax), Ethernet, dial-up, and the like. A circuit services network facilitates the provision of voice/data services to/from the wireless device 104. The packet data network and the circuit services network each support any number of single mode or multi-mode devices. Such networks can be further placed in communication with satellite equipment and wireless handsets capable of utilizing satellite communication. It should be appreciated that the packet data and circuit services networks can be in separate systems where one network is the home network of the wireless device and the other is the network being visited by the device.

The wireless communications system also broadly comprises a base station controller (BSC) 118 which can receive data from wireless device 104, allocate channels, control handovers, and generally perform a plurality of functions beyond the scope of this disclosure. The illustrated base station controller includes a control channel management module 120 and a device lookup table 130. The device lookup table includes equipment type information associated with a wireless device. Equipment type information can include device model, antenna information, software, device configuration specifications, and the like. The lookup table can also include network performance information associated with a particular wireless device type or a particular wireless model. The control channel management module provides control messages broadcasted to the wireless device and generally includes equipment identifier module 124 and channel encoder module 126. The channel encoder can encode a control message based on the identified equipment type, as provided in part by the device lookup module 130, and communicate control message signals to the wireless device 104 to query the wireless device or to make the device perform a function or operation with or without the user's knowledge. The wireless handset may or may not respond to the received control signal messages or notify the user thereof that such a message has been received. Based upon the identified wireless device type, the device's equipment, and/or the device's network performance history, the control channel management module can determine a broadcast message coding type for such control messages. The control channel encoder can encode a message directly or pass the determined coding type to the base station 118 with a message to be sent to the wireless device 104 over the broadcast channel. The equipment identifier module 124 helps determines the equipment type of a wireless device by requesting subscriber data from the AAA/VLR/HLR, as further described below. The equipment type identifier can request device information such as, for instance, International Mobile Subscriber Identity (IMSI), or International Mobile Equipment Identity (IMEI) information, and the like.

The wireless communications system also includes a variety of network components, shown collectively at 122. The set of network components includes modules for Authentication, Authorization and Accounting (AAA), a Home Location Register (HLR), a Visitor Location Register (VLR), among others, as would be understood by one skilled in this art. Generally, an AAA accesses a subscriber profile database to obtain information from a user/subscription profile associated with a wireless device. A HLR facilitates route calls, SMS messaging, and the like. A HLR can include an authentication center which generally comprises a database storing information associated with a wireless device subscription. Subscriber information is understood to generally comprise a set of access rights for subscribed services associated with a particular wireless device. A VLR generally acts as a temporary database for roaming wireless devices. A VLR obtains information associated with a wireless device either from the HLR or directly from the wireless device depending on the configuration implemented.

Also shown in communication with the illustrated wireless communications network is computer system 132 which is intended to represent one example computing system of a supplier of various supply commodities available for order by the user of wireless device 104 in accordance with the present method. The illustrated computer system 132 is shown as a desktop computer but can be any of a laptop, server, mainframe, or the like. System 132 has a housing case 134 wherein various internal hardware components reside. One such internal component is an electronic circuit board (or motherboard). The motherboard generally incorporates a processor capable of executing machine readable instructions, a memory, and various controllers for controlling the reading/writing of data to various media such as a flash memory, floppy disk, magnetic tape, optical disk, CD-ROM, DVD, USB device, etc. Such media are capable of storing software application programs, files, data, and the like. The motherboard is also in communication with a USB data port which acts as both an input and an output to allow software, files and data to be transferred to/from one or more external devices. Computer case 134 also houses a network interface card in communication with the motherboard to facilitate the transmission of data over wireless communication network 102 via wide area network 110. Examples network cards include a modem, an Ethernet card, and the like. It should be appreciated that computer system 132 can be placed in communication with any of the local area network 112 or the PSTN 114 to effectuate communication with wireless device 104.

The computer 132 includes a display 136 such as a CRT or LCD for the visual display of information, and a keyboard 138 for user data entry. Computer system 132 is also shown in communication with database 140 wherein various account records are stored by the supplier. The database is one known in the arts which is capable of interpreting a received query and retrieving the appropriate account records in response to that query. The database is also capable of adding new records and updating fields in existing records. The term "record" is used to refer to a software data structure, as known in the computing arts, containing one or more fields of information. Database are well known in the arts. As such, a further discussion as to an implementation of a specific database has been omitted. Database software can be purchased in the stream of commerce and installed on a variety of networked computing environments. Although the database is shown as a external device 140, it will likely be internal to the computer operating on a hard-drive or on some other non-volatile media. A computing system implementing a database could be placed in network communication with the Internet and, in turn, placed in communication with a recipient wireless device.

Many aspects of the Internet are widely known. Thus, a further discussion as to any particular aspect of the Internet has been omitted. Generally, data is transmitted over a network of computing systems in data packets via a plurality of communication links such as wireless, cable, fiber optic, or any of a variety of communication links known in the arts. Data is transferred over the communication links in the form of signals which may be electronic, electromagnetic, optical, or other signal forms. Various aspects regarding construction, implementation, and/or operation of the Internet are beyond the scope of this disclosure.

Example Database of User Account Records

As discussed, the present method facilitates the ordering of supply commodities from suppliers thereof by providing key operators and other managers of multifunction devices with the capability to quickly and efficiently order supplies for their various devices directly from their wireless handset device. When a buyer places an order in accordance herewith, an account record associated with that buyer is accessed by a computer system of the supplier. Such account records have been previously created and stored at the time the buyer established their account with the supplier to effectuate the purchase of supply commodities therefrom.

Figure 2:
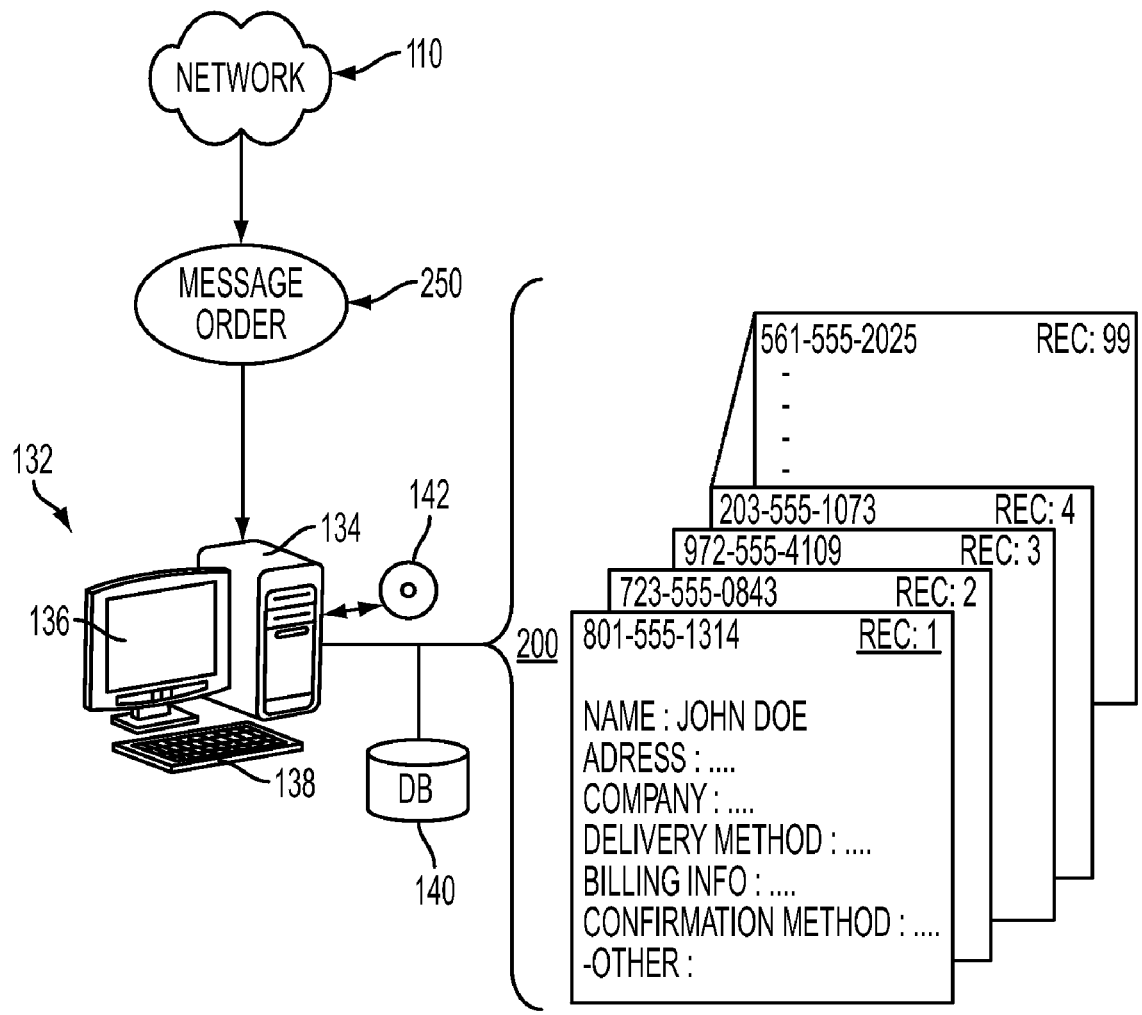
FIG. 2 illustrates an example plurality of buyer account records stored in the database of the supplier's system of FIG. 1.

Reference is now being made to FIG. 2 which illustrates an example plurality of buyer account records, collectively at 200, stored in database 140 of supplier computer system 132 of FIG. 1. The example computer system is shown having a computer readable medium 142 capable of storing machine instructions for implementing various aspects hereof and for storing or otherwise transferring various user account records to/from the computer system. The account records 200 are intended to be illustrative. The computer system receives an incoming order message 250 from the buyer over the network 110. Using device subscriber information received from the calling wireless device, the supplier's computer system 132 identifies the buyer placing the order. The received identification information may further be contained in the order message. Using the received information, the corresponding account record is retrieved from the supplier's database. Each of the account records contains a plurality of data fields previously entered at the time of the buyer's account was established with the supplier. The establishment of the buyer's account may occur in a variety of ways. In one example, a buyer enters account information into a form on the supplier's website. Once the account record has been established it is loaded into the database and indexed for subsequent retrieval using any of a variety of data fields in the record. The supplier can index the buyer's account record in any manner which conforms to any aspect of their business model. In the example shown, buyer account records are indexed by the identification number of the wireless device sending the assembled order message 250 to the supplier's computing system 132 via the wireless communication network. It should be appreciated that the telephonic numbers shown in any of the illustrated account records are entirely fictional. Any correspondence to a real number is accidental. The example account records contain the buyer's name, address, company information, delivery method such as UPS, FedEx, etc., billing information, desired type of confirmation to be performed, if any, upon the placement of an order, and any other information the supplier deems necessary and appropriate to engage a buyer in the underlying transaction.

Upon receipt of the order message from the wireless device, the supplier's system retrieves the account record associated with the wireless device from the database and proceeds to process the order. A confirmation of the received order message may or may not be sent to the buyer by the supplier. The method as to how the order is processed by the supplier will depend on the supplier's business model. In one example, the retrieved account record is printed and sent to a sales associate who manually assembles the desired quantities of the ordered supply commodities. The order is then packaged and sent to a shipping address according to the retrieved account record. Information is then passed to a billing department for billing the buyer's account in a manner as previously agreed. Alternatively, automated order processing systems which automatically retrieve the desired supply commodities and ship them can be implemented depending on the sophistication of the supplier's business.

The order message may further comprise information which is not an order for a supply commodity but rather may contain a message requesting an update be made to one or more fields of the buyer's account record. Such an order message may be sent in an alternative embodiment hereto wherein the user selects a graphical widget which is representative of an "account" icon. The user selects the account widget from the display of their wireless device to initiate an action to be taken by the supplier regarding the buyer's account record. In this example instance, upon receipt of such an order message from the user, the supplier would update the corresponding appropriate field(s) of the buyer's account record and store the modified account record to the database. The supplier may or may not confirm the order message or the buyer's request to update the account record. The order message may further contain information about the transference of funds to/from the buyer's account. The supplier would process such an order message in a manner as previously agreed or as defined by the buyer's account record. The funds would be transferred accordingly. The supplier may or may not confirm the order in a manner as previously agreed upon. It should be appreciated that the account record established by the supplier containing the buyer's information can contain any number of differing informational fields and the order message received via the wireless communication of FIG. 1 can cause the supplier to act or react in many different capacities. The supplier may further forward the order message, in whole or in part, to another provider or supplier for processing, or the supplier may contact a third party to further process or otherwise facilitate one or more aspects of the buyer's request.

Example Flow Diagram

Figure 3:
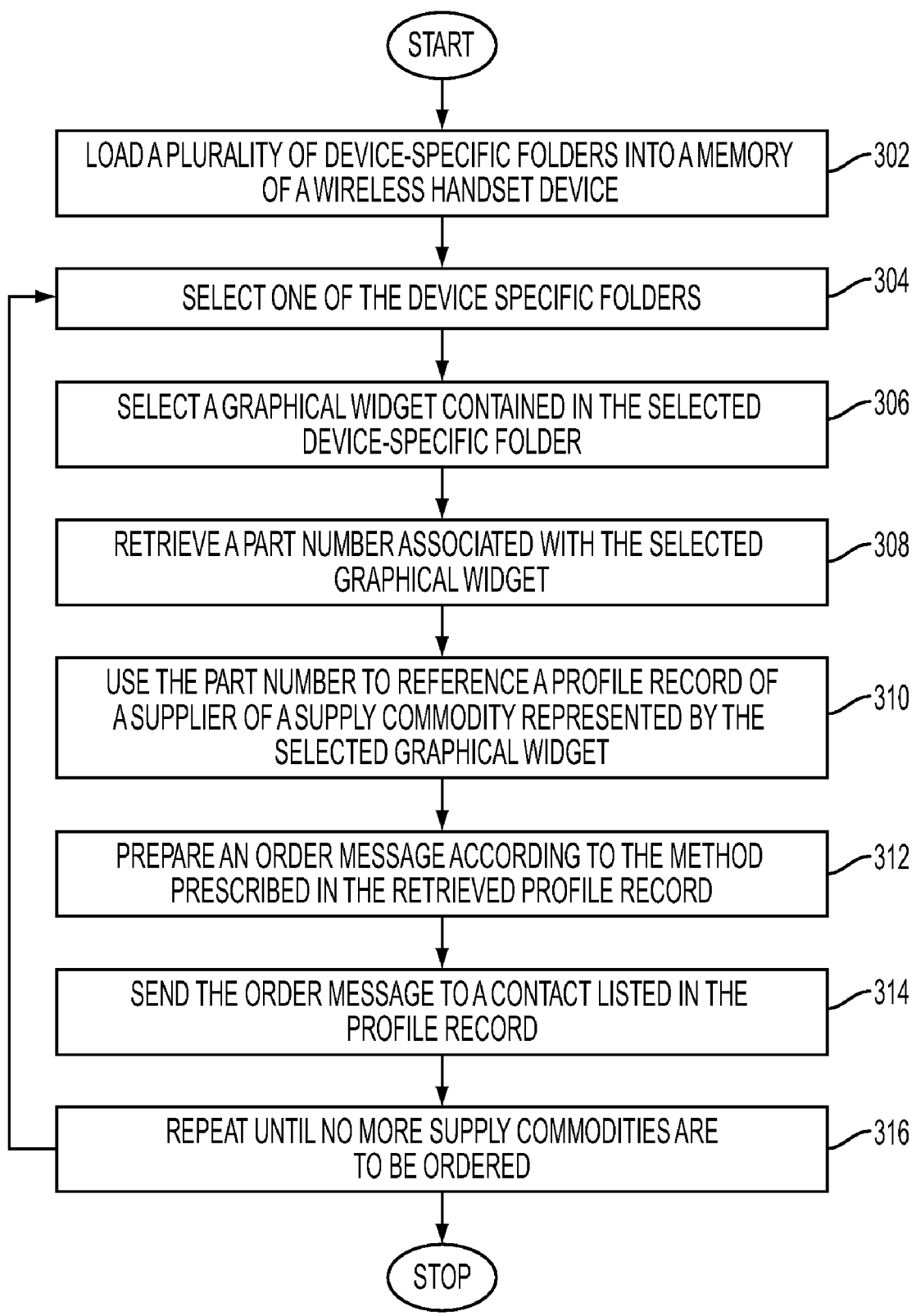
FIG. 3 illustrates one example embodiment of the present method for facilitating the ordering of supplies for a multifunction device via a wireless handset device over a wireless communication network.

Reference is now made to the flow diagram of FIG. 3 which illustrates one example embodiment of the present method for facilitating the ordering of supplies for a multifunction device via a wireless handset device over a wireless communication network.

In the example embodiment, at 302, a plurality of device-specific representations of multifunction devices are loaded into a memory of a wireless handset device. In one embodiment, the device-specific representations are folders each representing a different multifunction device. The device-specific folders can be loaded directly into the wireless handset from, for example, a memory card, such as a MicroSD card, inserted therein. The set of device-specific folder representations are downloaded from a supplier's website or are otherwise made available by a third party provider thereof. The buyer may even create and upload their own device-specific folder representations tailored to their own specific multifunction devices. An example set of device-specific representations is shown in FIG. 4.

Reference is now briefly being made to FIG. 4. One embodiment of the device-specific representations is shown as a plurality of iconic folders each representing a different multifunction device. In the illustrated example, each of the multifunction devices is a document reproduction system for which various supplies are available to be ordered. Other device-specific iconic folder representations can be used to represent other multifunction devices depending on the implementation of the present method. Such folder representations can be arranged hierarchically. Each iconic folder may also contain other iconic folders specific to sub-systems of the multifunction device. Each iconic folder contains one or more graphical widgets representing supply commodities available for that multifunction device. Text, audio, or video may be associated with any of the iconic folders. Such textual information is intended to be illustrative and does not represent an actual name of any particular multifunction device. One iconic folder 402 has the text "R9000" associated therewith. Another iconic folder 404 has the text "XMT-800" associated therewith. The buyer may be enabled to enter or otherwise modify the text associated with any given iconic folder representation. The example set of device-specific iconic folders may be provided by the supplier. These are then loaded into the wireless device by the buyer to facilitate the ordering of supply commodities.

Contained within or otherwise pointed to by the iconic folders are one or more graphical widgets, each representative of a different supply commodity available for order from a supplier thereof. A supply commodity can be anything that the customer orders for that multifunction device. Example supply commodities for a multifunction device which is a document reproduction system are ink, toner, paper, staples, replacement parts, software, manuals, training, service, upgrades, and/or technical support. FIG. 5 illustrates one example set of supply commodities available for the iconic folder 404 of FIG. 4. The multifunction device labeled "XMT-800" has several supply commodities associated therewith, each represented by a graphical widget (or icon) There is a graphical widget for a first and second toner, 502 and 504 which can be ordered for the XMT-800 multifunction device. There is a graphical widget for A5 paper 506 available for order. Another graphical widget is used to represent an entire pallet of A5 paper 508. A widget is for a ream of A4 paper 510. One widget represents 10 reams of A4 paper 512. A widget is for a box of staples 514 for this particular multifunction device. Another is for a carton of staples 515. Various colored inks (516, 517, 518) can be ordered. Associated with each of the graphical widgets contained in the iconic folder 404 is a part number for identification. The part number is preferably unique to the supply commodity such as, for instance, a universal product code (UPC) or a barcode. Part number, at 507, is associated with the A5 paper pallet 508. Part number, at 519, is associated with ink commodity 518. Also associated with each of the graphical widgets representing their respective supply commodities is a profile. The profile is a retrievable record containing information about the supplier. Such information includes a contact number to be used by the wireless device to place the order. The profile further includes information regarding the supplier's preferred ordering method. Order methods may prescribe, for instance, a coded message sequence to be used to send the message or a message protocol to implement. The ordering method may further include a pre-loaded order form to be used when ordering this particular supply commodity. It should be appreciated that one or more aspects of the supplier's profile may be unique for a given supply commodity even though these same commodities are available from the same supplier. Each supply commodity has a supplier profile associated therewith. Two or more supply commodities may be linked to the same supplier profile if no informational fields contained therein are different. Thus, the same profile can be stored and pointed to by different supply commodities.

Shown associated with A5 pallet 508 is profile 509. In one embodiment, profile record 509 associated for supply commodity 508 includes a pointer to an order form 511 stored in memory to be used when ordering. When the user selects that supply commodity, the order form is retrieved according to the profile pointer and filled out either automatically or manually before being sent to the supplier. Order forms, if any, associated with any of the profiles are pre-loaded into a memory of the wireless handset device. Additionally, the profile 509 contain pointers to other files stored in memory. Such other files include audio files, text files, video files, and other files intended to be used by the buyer when ordering. The profile record may further contain pointers to video, audio, and/or text files in memory which contain information about that supply commodity which the buyer may find useful or helpful. Such information may take the form of an advertisement for the supply or information about various pricing structures available for volume discounts. The profile further contain information which is specific to the supplier such as contact person, address, and the like. The supplier profile may contain further information about the product or the ordering processing. Shown associated with ink commodity 518 is part number 519 and supplier profiles 520 and 522. In this example, this type ink is available from two different suppliers.

In the illustrated example, part numbers 507 and 519 are shown separately from their respective profile records to illustrate the point that the part number may be stored separately from the profile record and used to index the associated profile record. In another embodiment, the part number is incorporated in the profile and the list of profiles are individually searched in memory until a match on part number has been found in the profile. The matching profile record(s) are retrieved from memory because these have been associated with a particular supply commodity. Since the part number is unique to each of the supply commodities in the hierarchy of iconic folder representations of the various multifunction devices, it provides a convenient alphanumeric reference to quickly identify one or more corresponding supplier profile record(s) stored in memory.

Alternatively, the graphical widgets in a given device-specific iconic folder are color-coded based on supplier. In such an embodiment, all graphical widgets in a particular folder of a multifunction device representing supply commodities available by a particular supplier are shaded with a particular color. Green, for instance, would represent each commodity available from one particular supplier. Red, for instance, would are associated with another supplier. In such an manner, the buyer can visually determine which of the various supply commodities are available from which suppliers. The supplier may also send a coded message directly to the buyer's handset device which visually or audibly highlights one particular graphical widget to indicate, for instance, that the highlighted supply commodity is available at a discount or has been back-ordered and is not available. Many other features and enhancements to the present method hereof can be made.

In the instance wherein a plurality of supplier profiles are associated with a particular part number of a given supply commodity, the user/buyer thereof would make a further selection as to which supplier to order this commodity from. One example supplier profile is shown in FIG. 6.

Figure 6:
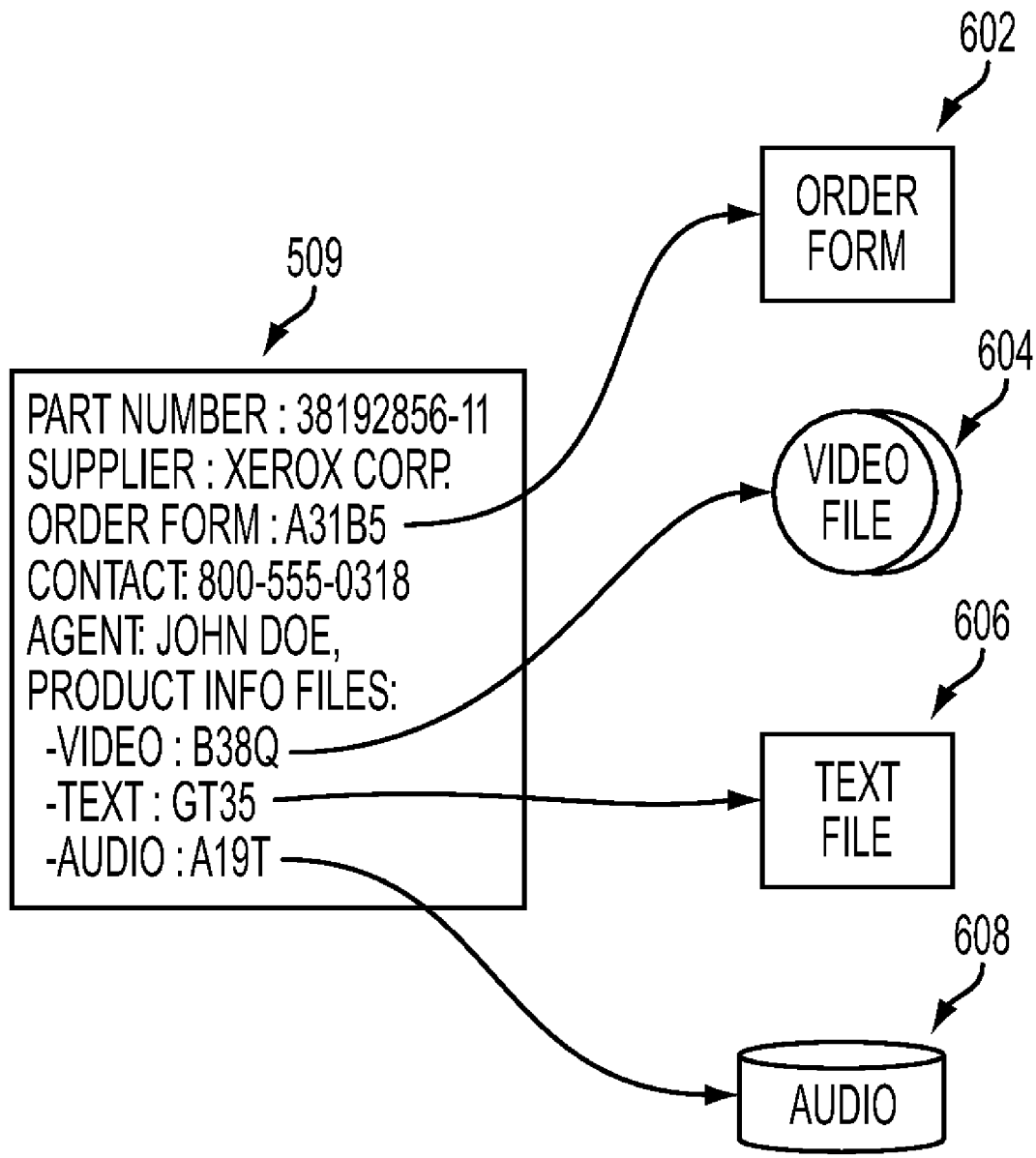
FIG. 6 illustrates one example supplier profile associated with the supply commodity 508 of FIG. 5.

Reference is now being made briefly to FIG. 6 which illustrates one example supplier profile 602 associated with supply commodity 508 of FIG. 5. The example profile contains a plurality of fields and is associated with a supply commodity having the part number "38192856-11". The supplier is the Xerox Corporation. To order this supply commodity, the supplier requires that form "A31B5" be used. This field of the profile points to the order form 602 stored in memory. This order form was preloaded onto the wireless handset device at the time the graphical widget for this supply commodity was loaded into the device's memory. The informational fields of the order form have been either pre-filled with the buyer's information as required by the supplier for the buyer to properly place an order for this supply commodity. One or more fields of the order form may require manual entry by the buyer using the wireless handset device's keypad. The supplier profile 509 contains a contact number and a contact name.

Advantageously, this particular supplier profile provides several product info files having the form of a video file 604, a text file 606, and an audio file 608. These files are also stored in the device memory after having been previously uploaded into the wireless device. These files may contain product specifications which the buyer may find helpful and information the buyer may find useful for ordering this particular supply commodity. The buyer may select one or more of the product info files displayed on the device display. These in turn will be retrieved from memory and played for the user on the device display or through the device's audio speakers. It is known how to point to an associated file in memory and to retrieve and play that file upon a user selection thereof. The illustrated supplier profile is only one example profile. Other fields may additionally be included with the supplier profile. The profile may take a form other than a record comprising informational fields.

With reference again being made to the flow diagram of FIG. 3, a user navigates the hierarchy of iconic folder representations using the navigation buttons of the wireless handset until the iconic folder representative of the specific multifunction device that the user intends to order supplies for is displayed. In one example embodiment, the user navigates the displayed device-specific folder representations and the sub-folders thereunder, if any, using the up/down left/right directional arrow buttons, shown at 806, of wireless device 800 of FIG. 8. The user selects one of the displayed device-specific for representations. At 304, the user selects the desired device-specific folder by pressing, for example, the "select" button 807 of FIG. 8. The selection of one of the iconic folders causes to appear on the display of the wireless handset device the graphical widgets contained in the selected iconic folder for that device. Each of the graphical widgets, as shown by way of example in FIG. 5, represents a supply commodity available for the selected multifunction device. The user navigates the displayed graphical widgets of supply commodities (either hierarchically or sequentially) contained in the previously selected iconic folder representation. At 306, the user selects one of the graphical widgets representing the supply commodity to be ordered. In response to the user selection thereof, at 308, the part number associated with the selected graphical widget is retrieved from a memory of the wireless handset device. At 310, the part number is used to reference an associated profile record stored in the device memory. In the event that multiple profiles of different suppliers are associated with a given part number, then the user is presented with the retrieved supplier profiles and is asked to make a selection as to which supplier to order the selected supply commodity from. At 312, an order message is prepared by the wireless handset device according to the ordering method prescribed in the retrieved supplier profile. As discussed, the supplier profile contains information regarding the supplier's desired method for ordering the selected supply commodity. The ordering method may prescribe the use of an order form to be filled-out and sent as a wireless message stream to a contact number listed in the profile. The ordering method may prescribe an order message comprising a specific text or an encoded message sequence of characters which is to be sent to a contact number. Such a contact number may be that of a third party as designated by the profile. The prepared order message, in part, identifies the supply commodity to be ordered. The order message may take the form of a text message, a canned audio or video message, a fax message, a hologram, or a prepackaged order form. The order message may be displayed to the user for a final confirmation prior to the placement of the order for the selected supply commodity. The order message may contain additional information as prepared in a manner prescribed by the profile. Depending on the ordering requirements as identified in the profile, the user/buyer may be prompted to enter a number for a quantity of the commodity to be ordered using a keypad of the wireless device. Otherwise, a default quantity is ordered as defined in the buyer's account record stored in the database of the computer system of the supplier. In this instance, the buyer may typically order 10 reams of A5 paper as defined in their account record. Thus, in the absence of a buyer-entered quantity when ordering A5 paper, a default of 10 reams is sent to the buyer by the supplier in response to receiving the order message for this particular supply commodity.

At 314, the order message is sent to the contact as provided by the retrieved profile. A confirmation of the order message may be sent by the supplier back to the wireless handset from which the order was placed. Confirmation may be provided by another means, such as by email or text message in a manner specified in the buyer's account record maintained by the supplier. The buyer's account profile may further contain other fields such as whether to confirm orders above a certain amount or above a certain quantity. The account record may further contain various other fields, as previously agreed between the buyer and supplier, necessary to complete or otherwise finalize the order. Such additional fields may mandate a management approval via an email or follow-up phone contact.

At 316, the ordering process is repeated for other supply commodities until no more supply commodities are desired to be ordered. In the instance wherein the user selects a plurality of graphical widgets for various supply commodities to be ordered, representations of the selected widgets are made to appear in an "order folder". Such a representation can be in the form of a shortcut to the selected graphical widgets to be ordered. When the user has finished selecting all the various graphical widgets, the user then navigates to the order folder wherein the selected supply commodities are represented. Thereafter, an order message is sent which places an order for each of the selected supply commodities to their respective suppliers using the ordering method prescribed in the associated profiles. In one embodiment, this is effectuated by automatically grouping the selected supply commodities in the order folder by supplier. The supply commodities can be further grouped or clustered in the order folder by type or by sub-system or the like. Alternatively, the graphical widgets of the selected supply commodities are placed in an order folder which is specific to each supplier. Thereafter, the grouped selected supply commodities are automatically ordered using either in a single order message where feasible, or using individual order messages prescribed by their respective individual profiles. The prepared order messages are then sent to the contact of each of the suppliers of the respected selected supply commodities.

In the instance wherein the user intends to order a particular supply commodity but cannot recall which particular graphical widget or which device-specific representation a particular supply commodity is for but the user has in their possession an empty box or carton or a discarded wrapper containing a barcode of that particular supply commodity, the camera function of the wireless handset can be used to obtain a photo of the barcode itself. The picture of the barcode can then be automatically decoded using barcode decoding software loaded onto the wireless handset device to obtain the part number associated with that commodity. Once the part number for the supply commodity has been determined, the part number is then used to point the user to the associated graphical widget. The user can then can select the identified graphical widget using the selection buttons of the wireless device in a manner as previously discussed. Thereafter, the associated supplier profile can be indexed and retrieved from memory and an order message prepared for the identified supply commodity. The order message is then sent to the supplier contact.

Alternatively, the wireless handset is used to receive the product code or barcode of the supply commodity or its particular part number through an RF link or Bluetooth capability or the like, placed in communication with a server or other computer system. The received part number for the unidentified supply commodity can then be used to reference that commodity's specific graphical widget. The reference graphical widget is then be displayed or otherwise highlighted on the display of the wireless handset.

In another embodiment, each time a user selects a graphical widget for a particular supply commodity and option appears on the device display giving the user the option to view the retrieved associated profile record. The user can then review the individual informational fields of the profile and, if desired, play any of the product information files identified by that profile for that supply commodity.

In another embodiment, one or more of the iconic folders for multifunction devices further contains graphical widgets in addition to those representing supply commodities. Such other widgets include, for example, a service widget. A graphical widget associated with an "Service" may be stored in with a device-specific folder of a multifunction device or stored separately therefrom. Upon a selection of the service widget by a user hereof, an associated service profile is retrieved from memory. The service profile record would be specific to a service provider and may be the same as the supplier. The service profile would contain, for example, a technician's name, experience level, contact information, hourly rate, availability, scheduling information, and the like. The service profile may further contain a video, text, or audio message from the technician identifying him/herself and providing additional information which the user/buyer may find helpful or useful when deciding to select a technician and/or place an order or make a request for that technician's service. Alternatively, the service profile contains retrievable text, video, and/or audio files, selectable by a user, which when played on the display of the buyer's wireless device, provide descriptions, actions, or methodologies for resolving common service problems such as paper jams or toner cartridge replacement steps and the like, which have been tailored to a particular multifunction device or sub-system thereof, which the buyer may find helpful or useful. The service profile may further contain user-selectable and playable audio/video files which instruct the user on how best to install a particular supply commodity onto that multifunction device such as, for instance, installing a toner cartridge into the device. An order message for service is then prepared according to the ordering method prescribed in the service profile. The order message for service is then sent to the contact listed in the profile. Sending the service order message places an order for a technical service for that multifunction device. Another order message may automatically send a predefined message or user-provided text message to a specific technician as identified by the profile. One or more unique service profiles may be associated with a given multifunction device or supply commodity part number. A service profile may be in addition to one or more associated supplier profiles. One example service profile has a form which is similar to the supplier profile of FIG. 6 but instead lists a technician's name or service provider's company in addition to, or in substitution for, the supplier's name shown in the associated field. Such a service provider would have a computer system and a database of account records in a manner as previously described with respect to the supplier computer system of FIGS. 1 and 2. Alternatively, the service provider, upon receipt of a service order message from a buyer, accesses the buyer's account record directly from the database of the supplier's computer system through agreements therebetween. Alternatively, the supplier receives the order message for a service and refers the order message to a qualified technician or service provider for a follow-up. All or part of the service profile may be displayed on the display of the wireless device for viewing, editing, or selecting by the user.

In yet another embodiment, other widgets in addition to the service widget are included in an iconic folder of a multifunction device. Such an additional widget is an account widget. A graphical widget associated with an "Account" may also be stored in with a device-specific folder representation of a particular multifunction device or stored separately therefrom. Upon a selection by a user hereof of an account widget, an account profile record is retrieved and displayed for the user. The account profile enables the user to access their account information stored in the supplier's database. The account profile contains a plurality of fields and may additionally point to one or more files in a manner as previously described with respect to the supplier and service profiles. Such additional fields may be, for instance, contact information which can be updated or changed by the user of the wireless handset device by a selection of that field. Upon a selection of one or more fields to be changed, an "order message" is prepared by the wireless device in a manner as prescribed by the account profile. Such an order message can take many forms such as a encoded sequence for security purposes. The assembled order message is then sent to the supplier's computer system which, in turn, interprets the coded sequence to ascertain that an update to the buyer's contact field is intended to be made. The supplier's database would retrieve the buyer's account record and make the requested update. A confirmation or password may be requested by the supplier's system and entered by the user of the wireless device. Other security options and features can be implemented which insure a secure communication between the wireless device and the supplier's database and which ensures that the user of the wireless device is authorized to make such a request for an account update or service request, or to order a particular supply commodity in a given quantity.

In another embodiment, a user selection of the graphical "account" widget initiates a secure communication directly between the user of the wireless device and the supplier's computer system upon retrieval of the buyer's account record. Such a communication therebetween may take the form of the supplier's server sending text messages requesting the user to enter a username and password or provide some other indication that the user is authorized. Wireless communication between the supplier's computer system and the wireless device can take any of a variety of forms, each displayable on the display of the wireless device and each answerable, or selectable, by the user thereof. Selection of an account widget may send an order message requesting one of the supplier's account representatives to initiate a communication with a contact person identified in the buyer's account record. Such a communication may be for the purpose of validating an order or service request, or to notify a manager of something or to make a request for authorization or approval. Many different fields can comprise the account record. All or part of the account profile may be displayed on the display of the wireless device for viewing, editing, or selecting by the user.

In yet another embodiment, another selectable graphical widget is a "funds" widget which, upon selection, authorizes a transfer of funds into the buyer's account as maintained by the supplier, to be drawn upon by the supplier in a manner as previously agreed upon. Such a "funds" option may be one of the options selectable in the account record or may be an entirely different selectable graphical widget. Options similar to those described with respect to the accounts widget would equally apply to the funds widget.

In another embodiment, the supplier sends updates to their profile and their various supply commodities directly to the wireless handsets of their respective buyers. The hierarchy of device-specific folders and the various graphical widgets contained therein would then be modified accordingly to reflect the received updates, changes, edits, additions and/or deletions. The supplier can send a coded message sequence directly to the wireless handsets of their respective buyers pointing that buyer to a graphical widget which, for example, may be available for ordering at a reduced rate, or which is being offered at a discount for volume purchases, and the like. Such coded message sequences can be tailored so that the recipient's wireless handset device receives the updates automatically without the buyer being notified. Such updates may be prescribed by the buyer's account record. The received files may further include new or updated video, audio, or text files to be associated with a particular supply commodity or multifunction device. Coded instructions provided to the wireless device direct the received files to their intended storage locations in memory and the associated profiles updated accordingly. All would take place with without the user of the wireless device being notified. Advertisements regarding various supply commodities can further be sent to the individual wireless handsets of the buyers by the suppliers.

Advantageously, through an implementation hereof, a supplier can track the various supply commodities which have been ordered by a given buyer for their respective multifunction devices. The supplier can analyze the historical buying patterns of a given buyer and notify the buyer accordingly that they might be getting low on certain supply commodities, such as ink or toner, given their order histories and an amount of time which has passed without an order for such consumables having been received by the supplier. In such a manner, the buyer can be kept apprised that they may be getting low on certain supply commodities in advance of their current supply reaching a level which may require a critical multifunction device to go offline until replacement parts or new supplies have been ordered, received, and installed. The supplier can also notify the buyer to contact them for some reason if, for instance, an order has been placed for a quantity which is outside their normal quantity ranges. Given that the supplier can track the order histories and analyze such histories, vital information may be quickly and easily communicated to a buyer in a timely manner.

Block Diagram of Example Wireless Handset Device

Figure 7:
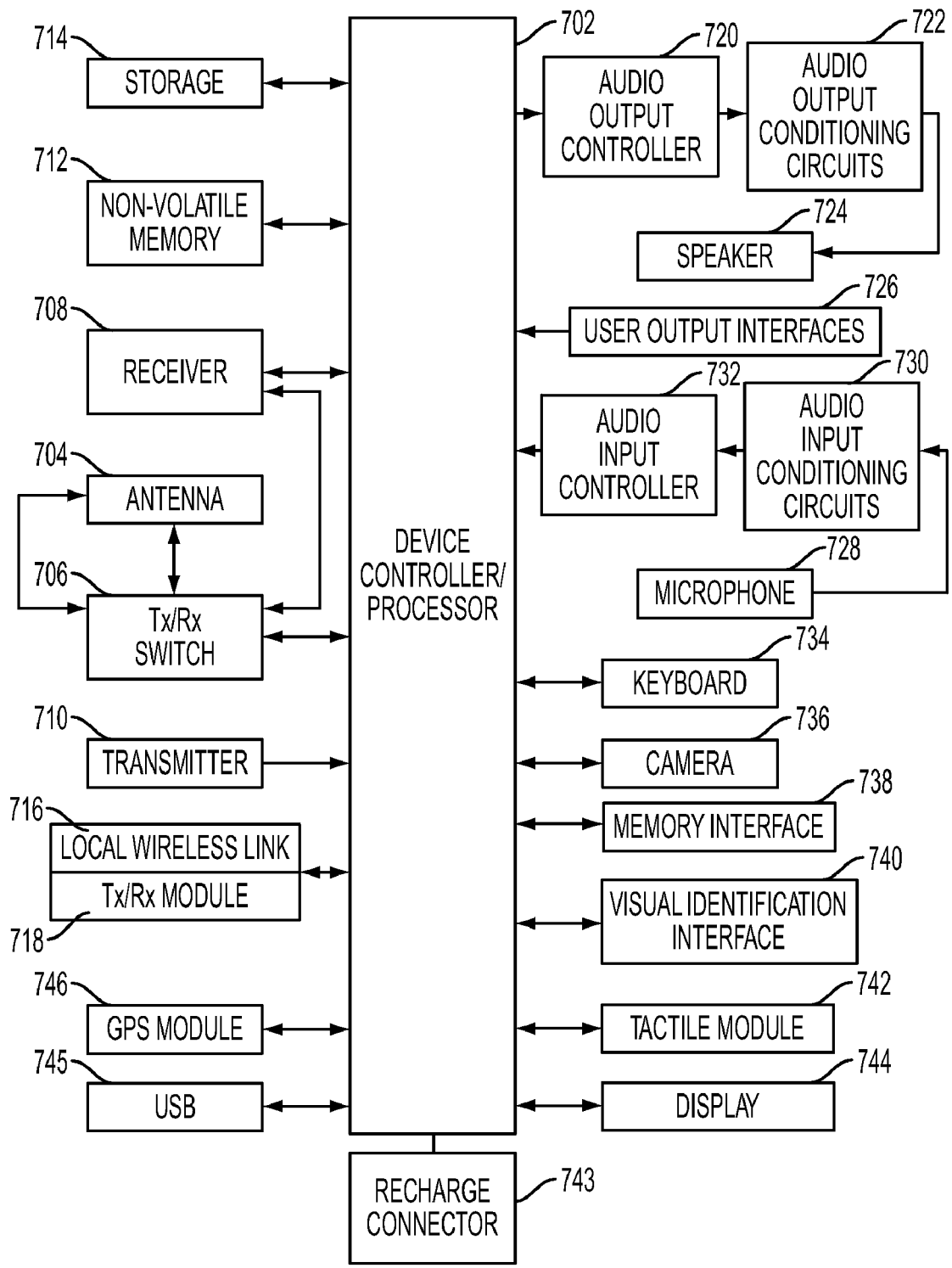
FIG. 7 illustrates a block diagram of one example embodiment of a wireless handset device in communication with the wireless communication system of FIG. 1 for carrying out one or more aspects of the present method.
Figure 8A:
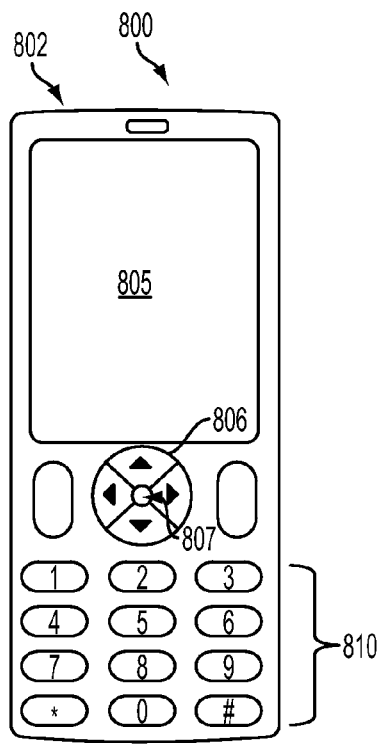
FIG. 8 illustrates one example wireless device for carrying out one or more features and aspects of the present method.
Figure 8B:
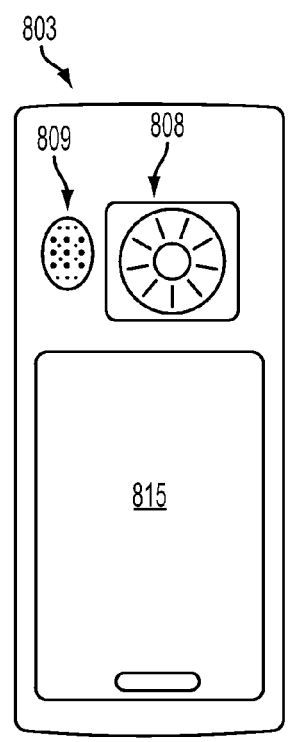
Figure 8C:
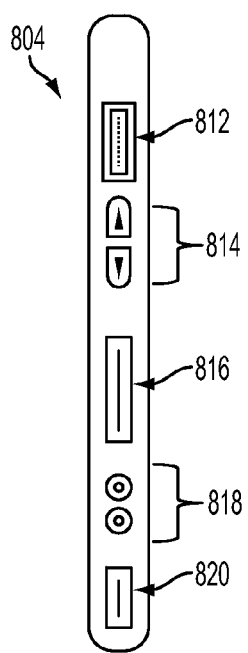
Figure 8D:
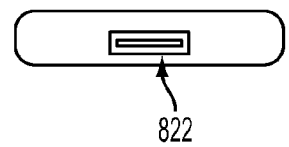

Reference is now being made to FIG. 7 which illustrates a block diagram of one example wireless apparatus in communication with the wireless communication system of FIG. 1 for carrying out one or more aspects of the present method.

For brevity and clarity, the illustrated example omits details such as wires, screws, and other hardware that operatively connect the various elements of the mobile wireless device together. Such operative connective elements will be known to those skilled in the art. It should be appreciated that the described components conform with the design constraints of a chassis molding (not shown) having the form, in one example embodiment, of a "candy bar" style wireless device. In another embodiment, the chassis takes the form of a flip style phone which includes a pair of hinged sections with a display disposed on one section and a keypad disposed on the other. In another embodiment, the wireless device has body sections that rotate or slide relative to each other.

In the illustrated embodiment, the example wireless device 704 incorporates a device controller/processor 702 designed to control the various functions and operations intended to be performed thereby. The processor 702 executes machine readable instructions contained in an operating system installed thereon. Such an operating system is a hardware/software construct containing machine instructions and is generally designed specifically for the device's hardware with respect to its intended functionality and features. Through an execution of one or more of the machine readable instructions, the processor accesses, retrieves, modifies, updates and stores data such as, for example, user information, information received as input, control messages, supplier profiles, part numbers, various associations between icons and files and data, and other information stored in a memory and/or storage device associated with the device hardware or placed in communication therewith.

Controller 702 further facilitates the sending and receiving of wireless communication signals. The controller implements the baseband functions of mobile voice and data communications protocols such as GSM, GSM modem for data, GPRS and CDMA, as well as higher-level messaging protocols such as SMS and MMS. The controller also implements the baseband functions of local area voice and data communications protocols such as IEEE 802.11, IEEE 802.15, and Bluetooth. In receive mode, the device controller 702 communicatively couples antenna 704 through transmit/receive (Tx/Rx) switch 706 to receiver 708. The receiver decodes the received wireless signals and provides the decoded signals to the device processor. In transmit mode, the device controller 702 communicatively couples the antenna through Tx/Rx switch 706 to transmitter 710 which transmits the communication signals. The device processor 702 operates the transmitter and receiver according to instructions stored in memory 712. Such instructions may include, for example, a neighbor cell measurement-scheduling algorithm. The wireless device also includes non-volatile storage 714 for storing data, records, and application tools and other software. The wireless device also includes an local wireless link 716 that allows the device to communicate directly with other wireless devices without using the wireless communication network. The local wireless link may, for example, enable the device with Bluetooth, RF, Infrared Data Access (IrDA), and other wireless link technologies. The local wireless link also includes a Tx/Rx module 718 that allows the wireless device to directly transmit/receive communication signals to/from another similarly configured device.

Wireless device 704 includes an audio output controller 720 that receives audio signals from receiver 708 or from Tx/Rx module 718. The audio controller is an electronic circuit which sends the received decoded audio signals to audio output conditioning circuit 722 that perform various conditioning functions such as noise filtering to reduce noise and/or amplify the audio signal prior to providing the signal to speaker 724 which allows the audio signal to be provided to the user/listener. Such an audio signal may be an audible alert notifying the user of a missed call, a received message, a voicemail waiting, an alarm, and the like. The wireless device further includes a user output interface 726 such as a headphone jack (not shown) or an optional hands-free speaker (also not shown).

Wireless device 704 also includes a microphone 728 for enabling a user to input audio signals into the device. Sound waves received by the microphone are provided to audio input conditioning circuit 730 which receives the audio signal and perform various electronic conditioning functions on the received input audio signal. Such conditioning may include filtering, noise reduction, and/or amplification. Audio input controller 732 receives the conditioned signals and sends a representation of the audio signal to device controller 702 for further processing depending on the nature of the operation intending on being performed by the wireless device.

Wireless device 704 also includes a keyboard 734 (or keypad) for effectuating an input by the user. Such a keyboard may take the form of a "qwerty" keyboard, or a likeness thereof, may simply be a keypad as is commonly found on most cellular telephonic devices known in the arts. In one embodiment, the keypad includes a joystick (or joystick-like feature) having a plurality of ranges of motion in different axes, such as up/down/left/right, allowing the user to navigate various menu options available for selection on the device display or to navigate a hierarchy of selectable folders or iconic representations thereof containing one or more graphical widgets available for user selection. The keypad 734 further incorporates one or more buttons which, when pressed, effectuate a "SELECT" or "ENTER" operation to accept the user input or to select an option currently being pointed to or highlighted on the device display.

In one embodiment, a front portion of the molding of the wireless device houses a printed circuit board (PCB) supported by the chassis which includes a number of momentary pushbuttons. Front molding mounts enclose various keyboard components including alphanumerical interface buttons typically arranged in convenient rows. The various integrated and discrete components that support the keyboard are fixed to the PCB. A conductive elastomeric overlay is positioned on the PCB beneath the keys which incorporates a carbon impregnated pill on a flexible profile. When one of the keys is pressed, it pushes the carbon pill into a 2-wire open circuit pattern on the surface of the PCB which provides a low impedance closed circuit. Alternatively, a small cap or dome is formed on the overlay corresponding to each button to be pressed. Additional multi-directional control buttons enable menu navigation and control inputs. A daughterboard circuit may further be mounted to the chassis for the control pad.

Wireless device 704 also includes a digital camera 736 for enabling a user to capture digital images or video directly into the device. The camera is typically mounted to the chassis molding to enable image capture through a hole in a rear cover portion of the molding. The camera includes a lens assembly and a CCD image sensor for capturing images. A lens cover in the hole protects the lens of the camera. The camera is operated by one or more buttons on the wireless device. One of the buttons actuates the opening of the camera lens. Other buttons may enable the camera to zoom-in on an object being photographed or to focus the lens. Received images are typically stored in non-volatile memory 712 but may be directed or re-directed to a removable flash memory card which has been inserted into memory interface 738. Images captured or otherwise received by the camera include a picture of a barcode or other product marking taken, for instance, directly from a box or a wrapping of a supply commodity. Specialized product decoding software pre-loaded into a memory or storage of the wireless device would orient the received picture to a defined orientation and decode the barcode or product identification marking. Using the decoded information, one or more data records stored thereon would be accessed (or remotely queried) to obtain a part number specific to the supply commodity. Other software applications loaded onto the wireless device may further act on the received image or the part number. The wireless device may also include sensors and/or motors (not shown) for electronically adjusting zoom, focus, aperture, exposure, f-stop, and the like, in relation to the digital camera.

The wireless device further includes a memory interface 738 which enables a user to plug directly into the device a removable memory card to effectively increase the total amount of memory of the device to a desired amount. One such memory might be a Micro-SD or other removable memory widely available in commerce. Micro-SD is a format for a removable flash memory (SD stands for "Secure Digital"). Such a memory stick can add, for example, 8-Gigabytes or more of addressable memory to the device. Other memory cards capable of being plugged directly into the memory interface of the example wireless device are also available in commerce. A memory card, which has been loaded with a plurality of device-specific folder representations and graphical widgets and profiles and part numbers and the like, as provided by a supplier or downloaded from a supplier website via the Internet, can be plugged into the memory interface 738. The memory card would contain machine readable instructions for carrying out various aspects of the present apparatus and methods. Such instructions can be uploaded into the device. Once installed, the processor of the wireless device would execute the machine readable instructions and various features and aspects of the present method in response to a user input. The memory card may be periodically removed from the wireless handset device and inserted into another computing device wherein the machine instructions and data records and other information contained thereon are updated with updates, revisions, and features and enhancements. The updated memory card is then re-inserted into the memory interface and the wireless handset is again ready to perform various aspects of the functionality described herein.

In another embodiment, the memory interface further enables the connection of a cable directly to the device which effectuates the connection of the device processor 702 to additional external resources wherein software and data for carrying out the present method are uploaded directly into the non-volatile memory of the wireless device. Such external resources may additional include peripheral devices such as external storage, printers, scanners, barcode readers, RF-links, and the like. External resources may include the wireless device being connected directly to one or more computing systems capable of accessing databases and other information. The connection of such external resources would depend on the sophistication of interface 738 and the software/hardware designs and constraints of the wireless device, the controller/processor, and the operating system employed. Other ports on the wireless device, such as universal serial bus (USB) 745, are also capable of effectuating the uploading and installation of the machine executable software applications, supplier profiles, device-specific folders containing the various graphical widgets and other information and data to facilitate an implementation of the present method thereon.

Wireless device 704 includes a visual notification module 740 is an electronic circuit for facilitating the rendering a visual notification (or indication) to the user in the event that the user's attention is to be directed to the device in some manner such as to a display, for example, in the event that a multimedia message has been received. Such a visual indication may include an audio sound such as a chime or ring, or may blink something on the display such as when the user's attention is directed to a particular graphical widget currently being displayed. The visual notification module may further be used to provide an alert to the user when the device has received a text message, a voicemail, or the user has missed an incoming call.

Wireless device 704 also includes a tactile interface 742 for controlling the delivery of a tactile alert, such as a vibration, to the user. For example, a multimedia message received by the wireless device may include a video component that provides a vibration during playback. The tactile interface may further be used during a silent mode to alert the user of an incoming call or message. The tactile interface allows this vibration to occur through a vibrating motor or oscillating rotator, or the like, not shown. In one embodiment, a vibration assembly (not shown) is mounted to the chassis molding of the wireless device and includes a motor that drives an eccentrically mounted weight which introduces a vibration into the device chassis which, in turn provides tactile feedback to the user.

The wireless device also includes a color display 744 which, in one embodiment, takes the form of a liquid crystal display (LCD) as is commonly known in the arts. A transparent lens protects the display. Other types of displays common to wireless handset devices are widely known. For instance, other embodiments of wireless device incorporate a display having the form of a touch-sensitive touchscreen designed to accept an input from the user directly through a physical touching of the display surface by a fingertip or a stylus. Touchscreen displays are widely known and are becoming increasingly integrated with wireless handsets presently available. Touchscreen displays are operated by a hardware/software construct and may, in some instance, replace the keyboard entirely with a software rendition thereof displayed directly thereon.

An optional Global Positioning System (GPS) module 746 is used to determine a location and/or velocity of the device. The GPS module is an electronic circuit which utilizes a triangulation of GPS satellites to compute a location of the device. A velocity of the device is determined by a change in device location over a given time interval. The GPS module may compute location using a triangulation method of cell towers in communication with the wireless device.

A chassis molding of the wireless device supports a data/recharger connection 733 which enables a proprietary data cable for uploading and downloading data such as address book information, photographs, messages, and any type of information that might be sent or received by the mobile device including machine executable software applications and data for carrying out the present method. The data/recharge connector includes contacts that enable recharging of a rechargeable battery (not shown) by an electrical AC-DC transformer. Such a battery would, in one example, be a lithium ion battery or a nickel metal hydride battery. The data/recharge connector is configured to receive a complimentary plug of the transformer and a circuit in communication therewith receives a relatively small electrical charge from the transformer device and distributes that charge to the battery.

It should be appreciated that any of the above-described aspects of the wireless device are controlled, in part, by the execution of machine readable instructions by the device processor 702. Other functionality of any of these device features may be controlled by software applications stored in memory which provide executable instructions to the processor. One or more of the components designed into any of the various electronic circuitry associated with any of the above-described features may further be controlled by an ASIC or other application specific device components.

Example Wireless Handset

Reference is now being made to FIG. 8 which illustrates one example wireless handset device having a "candy bar" form for carrying out one or more features and aspects of the present method.

The wireless handset device 800 is a mobile cellular telephonic device as is common known in the arts. Such a device is one example device which may include various features and embodiments shown and discussed with respect to the wireless device of FIG. 7. On a front portion 802 of the wireless handset device, is a display 805 for displaying the various hierarchy of device-specific folder representations and other menu options and information as previously described. The displayed folders, record fields, profile information, part numbers, and menus and options, and others, are made navigable and selectable by the user through the physical manipulation of any of the up/down left/right arrows of button 806. The middle "select" button 807 is pressed when the user desires to make a selection. Specialized software loaded onto the mobile cellular device 800 monitors which buttons have been pressed in response to a user selection, and directs the central processor (not shown) to take the appropriate action. Alphanumeric keypad 810, as is commonly known in the arts, may be used by the user to make entries such as, enter a quantity of a supply commodity to be ordered, or to provide information requested such as enter a password. Optionally, the wireless handset has a slideably retractable keyboard will full alphanumeric capabilities and special characters which can more readily enable the user to enter information. Optionally, the display is a touchscreen display which can provide a virtual keyboard for the user with which data entry can be easily and readily effectuated. A back portion 803 of the mobile cellular device 800 includes a removable battery 815, an audio speaker 809, and a camera lens 808 for receiving digital images therethrough. Side portion 804 includes a USB port 812, an up/down volume control 814, a memory interface slot 816, a set of voice/audio jacks 818, and a power input 820.

It should be appreciated that a wide variety of mobile cellular devices, with sufficient memory loaded thereon, can be used to implement the various embodiments and features and enhancements as described herein. Thus, the apparatus of the present method should not be viewed as being limited to the illustrations provided.

It should be understood that the flow diagrams depicted herein are illustrative. Other operations, for example, may be added, modified, enhanced, condensed, integrated, or consolidated. Variations thereof are envisioned and are intended to fall within the scope of the appended claims. The flowcharts and any of the embodiments described herein can be implemented on a micro-processor or micro-controller, an ASIC or other integrated circuit, a DSP, an electronic circuit such as a discrete element circuit, and the like, which can be incorporated into a wireless handset device as provided herein. In general, any wireless handset device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions which can be loaded onto a memory of the wireless handset device and executed by a processor of the device. Furthermore, the flow diagrams hereof may be partially or fully implemented in software using object or object-oriented software development environments that provide portable source code. One or more of the capabilities of the present method can be emulated in a virtual environment as provided by an operating system or other specialized programs loaded onto a wireless handset device and executed by a processor residing therein.

Any of the embodiments, and other features and enhancements described herein, can be transported or sold via a computer program product containing computer programs intended to be loaded onto a wireless handset such as a mobile cellular device. Such computer programs when executed, enable a the wireless device to perform the capabilities and functionally described herein. Computer program product is intended to be used interchangeably with other similar terms such as, computer executable medium, computer usable medium, computer readable medium, and the like. Such terms refer to any media such as main memory, secondary memory, removable storage, a hard disk, and signals, capable of providing data, instructions, or other machine readable instructions and information to a central processor. Computer program products may include non-volatile memory, such as a floppy, ROM, flash, disk memory, and other storage media known in the arts capable of transporting data and machine readable instructions. Computer readable medium may also comprise computer readable information in a transitory state such as a network link and/or a network interface, including a wired or wireless network, which allows a computer to read such information. Machine executable programs for carrying out one or more aspects of the present method may also be received by the wireless handset device via a communications interface.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed special purpose computer, a microprocessor, or the like, of a wireless handset device.

One or more aspects of the methods described herein are intended to be incorporated in an article of manufacture, including one or more computer program products, containing computer readable media. The article of manufacture may be included on at least one storage device readable by a machine architecture or other processing system embodying executable program instructions. The article of manufacture may be included as part of a computer system, an operating system, a plug-in, or may be shipped, sold, leased, or otherwise provided separately either alone or as part of an add-on, update, upgrade, or product suite.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. Accordingly, the embodiments set forth herein above are considered to be illustrative and not limiting. Various changes to the above-described embodiments may be made without departing from the spirit and scope of the invention.

What is claimed is:

1. A method for facilitating ordering of supplies, the method comprising:
   presenting on a display of a wireless handset device, using a processor accessing memory, a hierarchy of iconic folders, each iconic folder representing a particular multifunction device, within each iconic folder is at least one graphical widget representing a supply commodity specific to a multifunction device, associated with each graphical widget is a profile of at least one supplier of that particular commodity, said profile containing at least in part contact information about said supplier and further containing information pertaining to ordering that commodity from that supplier, where each commodity that is available from said supplier is shaded with a separate color in said iconic folder representing said particular multifunction device;
   receiving the graphical widget inside said iconic folder representing said supply commodity desired to be ordered;
   retrieving from said memory a supplier profile associated with said graphical widget;
   assembling an order message for said supply commodity as per ordering requirements identified in said supplier profile; and
   using said wireless handset to send said order message to said supplier to order said supply commodity for said multifunction device.

2. The method of claim 1, further comprising:
   using a camera function of said wireless handset device to capture a barcode of said supply commodity into said wireless handset; and
   using said wireless handset to decode said captured barcode to identify said graphical widget representing said supply commodity.

3. The method of claim 1, wherein assembling said order message further comprises
   entering a number for a quantity of said supply commodity to be ordered.

4. The method of claim 1, wherein said order message comprises any of: a text message, an audio message, or a video message.

5. The method of claim 1, further comprising:
   receiving into a memory of said wireless handset device a message which directs said user to a particular graphical widget; and
   highlighting said particular graphical widget on said display of said wireless handset device.

6. The method of claim 1, further comprising receiving updates into a memory of said wireless handset involving any of: iconic folders, graphical widgets, supplier profiles, sales information, or new supply commodities being offered.

7. A system for ordering supplies for a multifunction document reproduction device, the apparatus comprising:
   a wireless handset device capable of two-way wireless communication with a computer system over a cellular telephonic network, said wireless handset having a memory, a display, and buttons for navigating folders displayed on said display; and
   a processor in communication with said memory, said processor executing machine readable instructions to perform the method of:
   retrieving from said memory a hierarchy of iconic folders and displaying said iconic folders on said wireless handset display for a user navigation and selection, each iconic folder representing a particular multifunction device, within each iconic folder is at least one graphical widget representing a supply commodity specific to a multifunction device, associated with each graphical widget is a profile of at least one supplier of that particular commodity, said profile containing at least in part contact information about said supplier and further containing information pertaining to ordering that commodity from that supplier, where each commodity that is available from said supplier is shaded with a separate color in said iconic folder representing said particular multifunction device;
   processing a user navigation of said hierarchy of iconic folders;
   receiving a user selection of one of said iconic folders representing a particular multifunction device for which a supply commodity is desired to be ordered;
   receiving a user selection of a graphical widget inside said selected iconic folder representing said supply commodity desired to be ordered;
   retrieving from said memory of said wireless handset a supplier profile associated with said selected graphical widget;
   assembling an order message for said selected supply commodity as per ordering requirements identified in said retrieved supplier profile; and
   transmitting said assembled order message cellular telephonic network to said supplier identified by said contact information to order said selected supply commodity for said multifunction device.

8. The system of claim 7, further comprising:
   using a camera of said wireless handset device to capture a barcode of said supply commodity into a memory of said wireless handset; and
   decoding said captured barcode to identify said graphical widget representing said supply commodity.

9. The system of claim 7, wherein assembling said order message further comprises
   receiving a user entry of a number for a quantity of said supply commodity to be ordered.

10. The system of claim 7, wherein said order message comprises any of: a text message, an audio message, or a video message.

11. The system of claim 7, further comprising:
    receiving into a memory of said wireless handset device a message which directs said user to a particular graphical widget; and
    highlighting said particular graphical widget on said display of said wireless handset device.

12. The system of claim 7, further comprising receiving updates into a memory of said wireless handset involving any of: iconic folders, graphical widgets, supplier profiles, sales information, or new supply commodities being offered.

13. A computer program product for facilitating ordering of supplies comprising a computer readable storage medium having computer readable program code embodied therewith, the computer readable program code comprising computer readable program code configured to:

present on a display of a wireless handset device, using a processor accessing memory a hierarchy of iconic folders, each iconic folder representing a particular multifunction device, within each iconic folder is at least one graphical widget representing a supply commodity specific to a multifunction device, associated with each graphical widget is a profile of at least one supplier of that particular commodity, said profile containing at least in part contact information about said supplier and further containing information pertaining to ordering that commodity from that supplier, where each commodity that is available from said supplier is shaded with a separate color in said iconic folder representing said particular multifunction device;

receive the graphical widget inside said iconic folder representing said supply commodity desired to be ordered;

retrieve from said memory a supplier profile associated with said graphical widget;

assemble an order message for said supply commodity as per ordering requirements identified in said supplier profile; and use said wireless handset to send said order message to said supplier to order said supply commodity for said multifunction device.

14. The computer program product of claim 13, further comprising:

using a camera function of said wireless handset device to capture a barcode of said supply commodity into said wireless handset; and using said wireless handset to decode said captured barcode to identify said graphical widget representing said supply commodity.

15. The computer program product of claim 13, wherein assembling said order message further comprises entering a number for a quantity of said supply commodity to be ordered.

16. The computer program product of claim 13, wherein said order message comprises any of: a text message, an audio message, or a video message.

17. The computer program product of claim 13, further comprising:

receiving into a memory of said wireless handset device a message which directs said user to a particular graphical widget; and highlighting said particular graphical widget on said display of said wireless handset device.

* * * * *